Aug. 28, 1923.
H. J. FERRIS
RUBBER TIRED WHEEL
Filed March 6, 1922
1,466,210
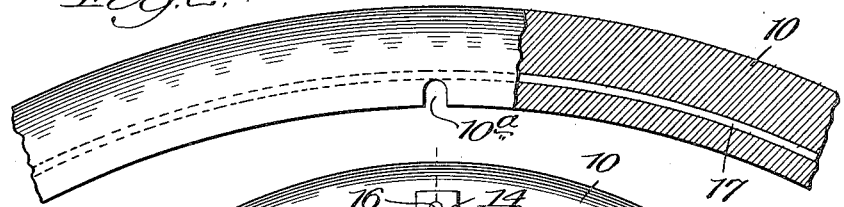
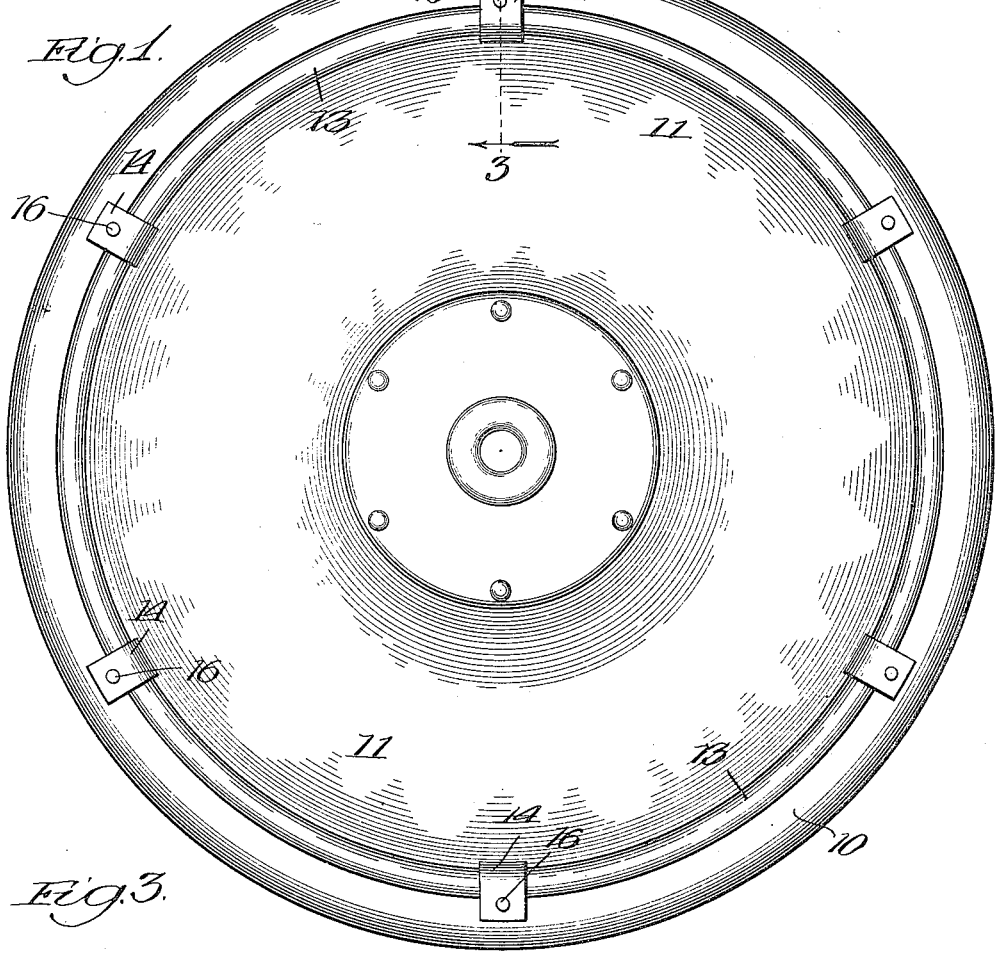
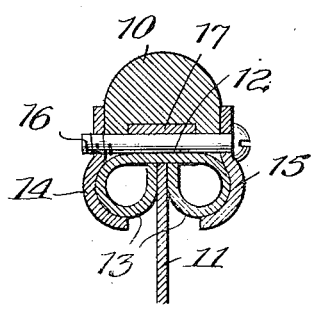
Inventor:
Howard J. Ferris, Patented Aug. 28, 1923.

1,466,210

UNITED STATES PATENT OFFICE.

HOWARD J. FERRIS, OF HARVARD, ILLINOIS, ASSIGNOR TO HUNT, HELM, FERRIS & COMPANY, OF HARVARD, ILLINOIS, A CORPORATION OF ILLINOIS.

RUBBER-TIRED WHEEL.

Application filed March 6, 1922. Serial No. 541,344.

*To all whom it may concern:*

Be it known that I, HOWARD J. FERRIS, a citizen of the United States, residing at Harvard, in the county of McHenry and State of Illinois, have invented a new and useful Improvement in Rubber-Tired Wheels, of which the following is a specification.

This invention relates to rubber tired wheels and is particularly adapted to be used on toy wagons and the like.

The primary object of this invention is to provide a rubber tire which can be readily applied to a metal rim or removed therefrom so that the vehicle may be used with either the metal rim or rubber tire as desired.

Another object is to provide a rubber tire which is so strengthened against lateral stresses as to permit its use on a flangeless rim.

Another object is to provide a means for securing such a tire on such a rim so that it can be readily applied thereon or removed therefrom.

These and other objects are accomplished by my invention which is fully described in the following specification and shown in the accompanying drawings in which:

Figure 1 is a side elevation of a wheel embodying my invention; Fig. 2 is an enlarged partial side elevation of the tire partly in section; and Fig. 3 is an enlarged section on the line 3 of Fig. 1.

In the embodiment illustrated, the rubber tire 10 is applied to a disk wheel 11 having a rim which has a cylindrical bearing portion 12 and inwardly rolled edges 13 which are preferably wider than the tire as shown in Fig. 3.

The tire 10 is secured on the rim by means of cleats 14 and 15 which are formed to fit the curved edges of the rim. A bolt 16 passes through the opening 10ª in the tire 10 and through the cleat 15, over the outside of the rim and preferably in contact therewith and is secured into the cleat 14, thereby retaining the tire 10 on the rim. As the bolt 16 is tightened, the cleat 14 becomes canted and acts as a burr on the bolt to prevent it from being withdrawn.

A metal band 17 cylindrical in form is embedded in the tire and is preferably in contact with the bolts 16. This band greatly stiffens the tire against lateral stresses and aids the cleats 14 and 15 in retaining it on the rim.

The bolts 16 may be readily removed by means of a screwdriver and the tire 10 removed from the wheel. This wheel it will be observed is adapted to run on the rim 12, so that it may be used either with or without the tire 10.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. In combination, a vehicle wheel rim having a substantially cylindrical bearing surface, a rubber tire adapted to fit thereon, means for stiffening said tire laterally, cleats at each side of the rim and tire and a screw connecting each pair of said cleats to retain the tire on the rim, the outer ends of the cleats overhanging the rim and each screw being screwed into an overhanging end of one cleat of each pair of cleats so that as the screws are tightened, each cleat acts as a lock to retain the screw therein.

2. In combination, a vehicle wheel rim having a substantially cylindrical bearing surface having inwardly curved edges, a rubber tire adapted to fit thereon, a metal band embedded within said tire of greater stiffness laterally than radially, cleats fitting said curved edges and screws passing through said cleats and extending transversely across said tire between said band and rim for securing said tire on said rim.

3. In combination, a vehicle wheel rim having a substantially cylindrical bearing surface, a rubber tire adapted to fit thereon, means for stiffening said tire laterally, cleats at each side of the rim and tire and screws connecting said cleats to retain the tire on the rim, said rim having inwardly curved edges, said cleats having curved portions fitting over said edges, the outer ends of the cleats overhanging the rim and each screw being screwed into an overhanging end of a cleat so that as said screw is tightened, said cleat acts as a lock to retain the screw therein.

HOWARD J. FERRIS.